United States Patent [19]

Kishi et al.

[11] Patent Number: 4,728,872
[45] Date of Patent: Mar. 1, 1988

[54] ROBOT PATH ERROR CORRECTION SYSTEM

[75] Inventors: Hajimu Kishi, Hino; Shinsuke Sakakibara, Komae; Takayuki Ito; Tatsuo Karakama, both of Hino, all of Japan

[73] Assignee: Fanuc Ltd, Minamitsuru, Japan

[21] Appl. No.: 899,299

[22] PCT Filed: Dec. 26, 1985

[86] PCT No.: PCT/JP85/00724

§ 371 Date: Aug. 14, 1986

§ 102(e) Date: Aug. 14, 1986

[87] PCT Pub. No.: WO86/04162

PCT Pub. Date: Jul. 17, 1986

[30] Foreign Application Priority Data

Dec. 29, 1984 [JP] Japan .................. 59-278385

[51] Int. Cl.⁴ .................................. G05B 11/26
[52] U.S. Cl. .......................... 318/568; 318/567; 318/603
[58] Field of Search ............... 318/568, 568 C, 568 D, 318/568 M, 569, 574, 572, 521 C, 561, 632, 603, 601; 364/167–170, 513; 901/9, 20

[56] References Cited

U.S. PATENT DOCUMENTS

| | | | |
|---|---|---|---|
| 4,128,794 | 12/1978 | Burleson | 318/603 |
| 4,550,383 | 10/1985 | Sugimoto | 318/568 C |
| 4,555,758 | 11/1985 | Inaba et al. | 901/20 |
| 4,591,771 | 5/1986 | Nozawa et al. | 318/632 |

Primary Examiner—William M. Shoop, Jr.
Assistant Examiner—D. Martin
Attorney, Agent, or Firm—Staas & Halsey

[57] ABSTRACT

A robot path error correction system is provided for driving and controlling a movable element in a designated direction. The system includes a sensing device for sensing a remaining amount of command pulses at deceleration of the movable element; timing deciding device for specifying start timing of a pulse distribution calculation along a subsequent travel path in dependence upon the sensed amount of command pulses remaining; and an adding device for adding command pulses which accelerate the feedrate and command pulses which decelerate the feedrate in accordance with a commanded velocity and commanded position at the specified timing.

2 Claims, 8 Drawing Figures

ROBOT PATH ERROR CORRECTION SYSTEM

DESCRIPTION

BACKGROUND OF THE INVENTION

This invention relates to a robot path error correction system for facilitating the drive and control of the movable element of a machine tool or the hand of a robot, the acceleration and deceleration of which is controlled.

In a control system for controlling the axial movement of a machine tool or robot, the conventional practice generally is to effect acceleration and deceleration in such a manner that the control system will not be subjected to shock or vibration at the start of axial movement and at deceleration. One example of such an acceleration/deceleration control method is to exponentially accelerate or decelerate the supply rate of pulses generated to correspond to the axially traveled distance.

FIGS. 5(a), (b), (c) are views illustrating drive states for a case in which two different velocity commands are programmed in succession. Time is plotted along the horizontal axis and velocity along the vertical axis. FIG. 5(a) illustrates a commanded velocity F1 from time $t_1$ to time $t_2$ for movement from a coordinate point P1 to a commanded position P2, and a commanded velocity F2 from time $t_2$ to time $t_3$ for movement to a subsequent commanded point P3. In actuality, however, when effecting movement to the commanded position P3 via the commanded position P2, a delay 2T is involved, as shown in FIG. 5(b), where T is the time needed for acceleration and deceleration.

The reason for this delay time is to carry out velocity control in such a manner that the control system will not be subjected to shock or vibration when starting and stopping movement in a case where axial movement of a machine tool or robot is controlled.

A method utilized to reduce this delay time is to ignore positioning at the intermediate commanded position P2 and effect acceleration up to the next commanded velocity F2 without performing deceleration at time $t_2$. As shown in FIG. 5(c), this entails performing a pulse distribution calculation along each axis corresponding to the commanded position P3 based on velocity command pulses for accelerating a feed rate up to the commanded velocity F2 at time $t_2$, which is the start of deceleration, and gradually driving the movable element in the designated direction. In accordance with this method, the resulting delay time is T. Moreover, by changing the commanded velocity, the robot trajectory can be made to approach a desired path.

Codes indicating these control functions are referred to as G11 and G12 and are used in an automatic acceleration/deceleration function, interpolation function and the like, as well as in the drive and control of machine tools. However, since the size of an arc described by the trajectory of the movable element changes whenever the commanded velocity changes, a system that corrects a path error by such control codes requires the creation of a complicated program in order to reduce the path error of the robot.

SUMMARY OF THE INVENTION

An object of the present invention is to provide a robot path error correction system which reduces delay time at acceleration and deceleration involved in controlling the axial movement of a machine tool or robot, and which enables a robot trajectory to approach a desired path with ease irrespective of the designated velocity.

According to the present invention, there is provided a robot path error correction system for performing a pulse distribution calculation along each axis in dependence upon commanded position data on the basis of velocity command pulses for accelerating and decelerating a feedrate to a commanded velocity at a predetermined time constant, and driving and controlling a movable element in a specified traveling direction. The system includes sensing means for sensing a remaining amount of command pulses at deceleration of the movable element; timing deciding means for specifying start timing of a pulse distribution calculation along a subsequent travel path in dependence upon the sensed amount of command pulses remaining; and adding means for adding command pulses which accelerate the feedrate and command pulses at deceleration in accordance with a commanded velocity and commanded position at the specified timing.

The path error correction system of the present invention decides a timing for transition to acceleration control, based on a velocity command to the next commanded position in dependence upon the number of pulses accumulated after deceleration of the feedrate, and makes the transition to acceleration control by appropriately cutting deceleration time. As a result, delay time can be set to a small value and the robot trajectory can easily be made to approach a desired path irrespective of the commanded velocity.

DETAILED DESCRIPTION OF THE PREFERRED EMBODIMENTS

Figure 1:
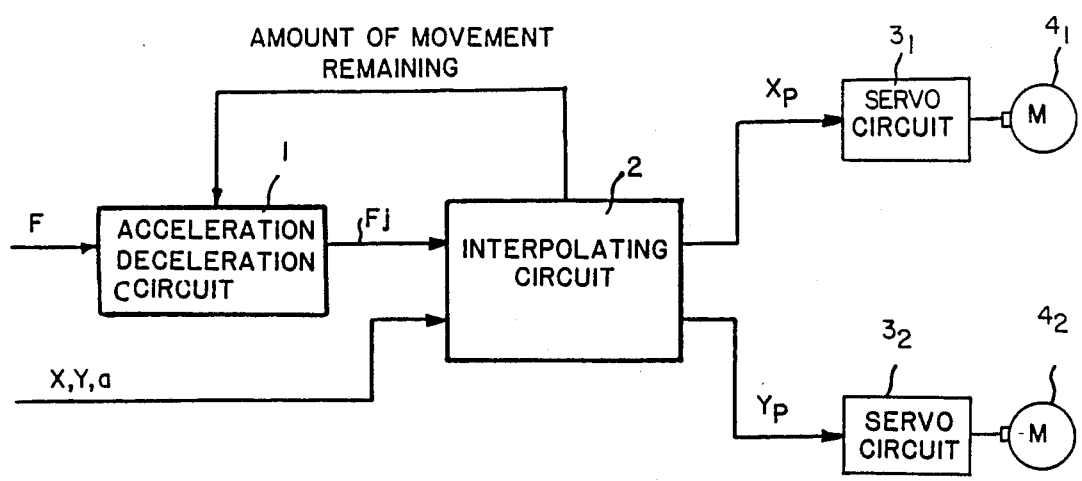
FIG. 1 is a block diagram illustrating an embodiment of the system of the present invention.

The present invention will now be described in detail based on an embodiment illustrated in the drawings.

FIG. 1 is a block diagram illustrating an embodiment of the system of the present invention. In the Figure, numeral 1 denotes an accelerator/decelerator circuit for accelerating and decelerating feedrate to a commanded velocity at a predetermined time constant and consisting of a register, accumulator, adder and the like. The accelerator/decelerator circuit 1 begins deceleration when a deceleration distance dependent upon feedrate becomes equal to an amount of movement remaining to be made, which is fed back from an interpolating circuit, described below. The interpolating circuit 2 generates distributed pulses Xp, Yp by performing a pulse distribution calculation, which is based on data indicative of amount of movement, whenever the accelerator/decelerator circuit 1 generates an output pulse Fj. The distributed pulses Yp, Xp drive respective servomotors $4_1$, $4_2$ via servo circuits $3_1$, $3_2$ respectively.

The interpolating circuit 2: senses a remaining amount of command pulses at deceleration; designates start timing of a pulse distribution calculation along the next traveling path, from the sensed amount of command pulses remaining and a parameter "a" specifying an accumulated amount; and adds command pulses which accelerate the feedrate and command pulses which decelerate the feedrate in accordance with a commanded velocity F and a commanded position.

Figure 2:
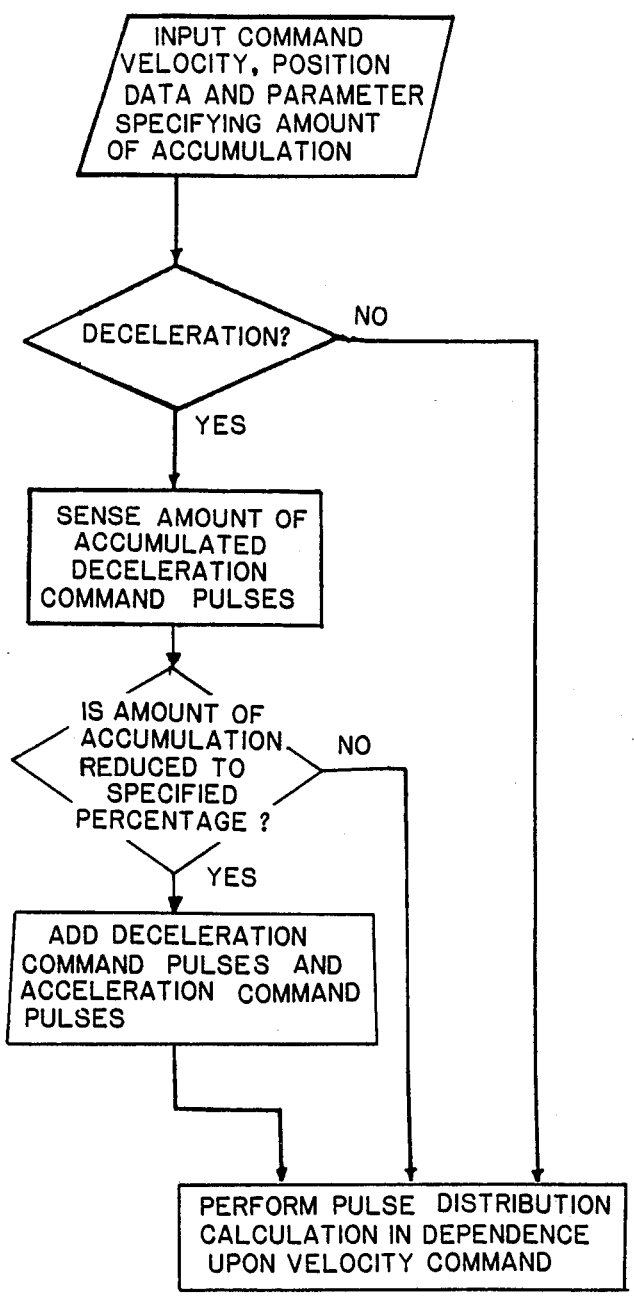
FIG. 2 is a flowchart illustrating the operation of an interpolating circuit used in the system of the present invention.

FIG. 2 is a flowchart indicating the procedure of the pulse distribution calculation performed in the interpolating circuit 2.

Next, an embodiment of acceleration/deceleration control in accordance with the system of the present invention will be described with reference to FIGS. 3 and 4.

Figure 3A:
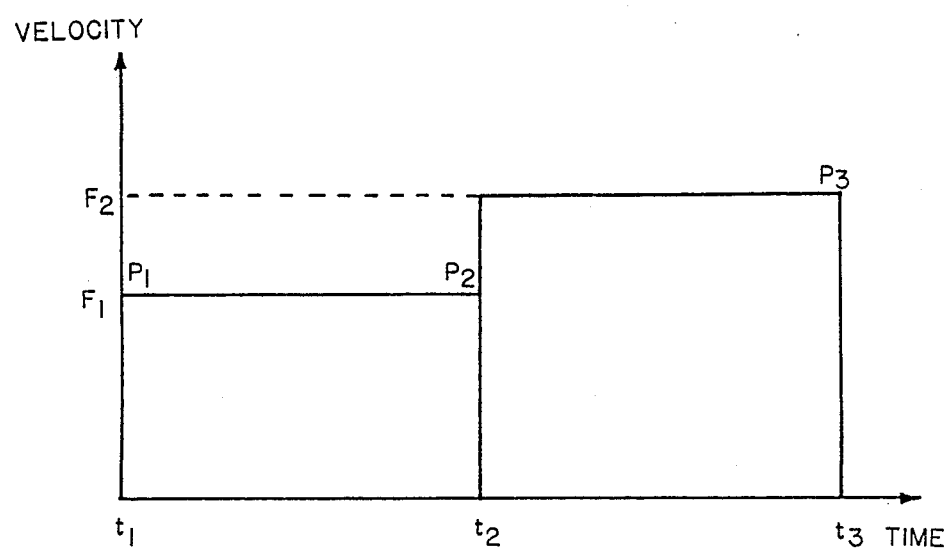
FIG. 3 is a graph illustrating characteristics of an embodiment of a velocity control system according to the present invention.

FIGS. 3(a), (b) illustrate examples of linear acceleration/deceleration control, in which the rate at which a drive pulse signal is supplied is plotted along the vertical axis and time is plotted along the horizontal axis.

In FIG. 3(a), in which two different velocity commands are programmed in succession, F1 indicates a commanded velocity from time $t_1$ to time $t_2$ for movement from a coordinate point P1 to a commanded position P2, and F2 indicates a commanded velocity from time $t_2$ to time $t_3$ for movement to a subsequent commanded point P3. The interpolating circuit 2 decides the pulse distribution start timing by specifying, e.g. 40%, as a parameter "a" for multiplying an accumulated amount of command pulses at deceleration from velocity F1. The actual trajectory for movement to the commanded position P3, where the acceleration and deceleration time constant is T, slants gradually in the direction of the commanded position P3 short of the commanded position P2 without traversing this point, as shown for example in FIG. 4.

Figure 3B:
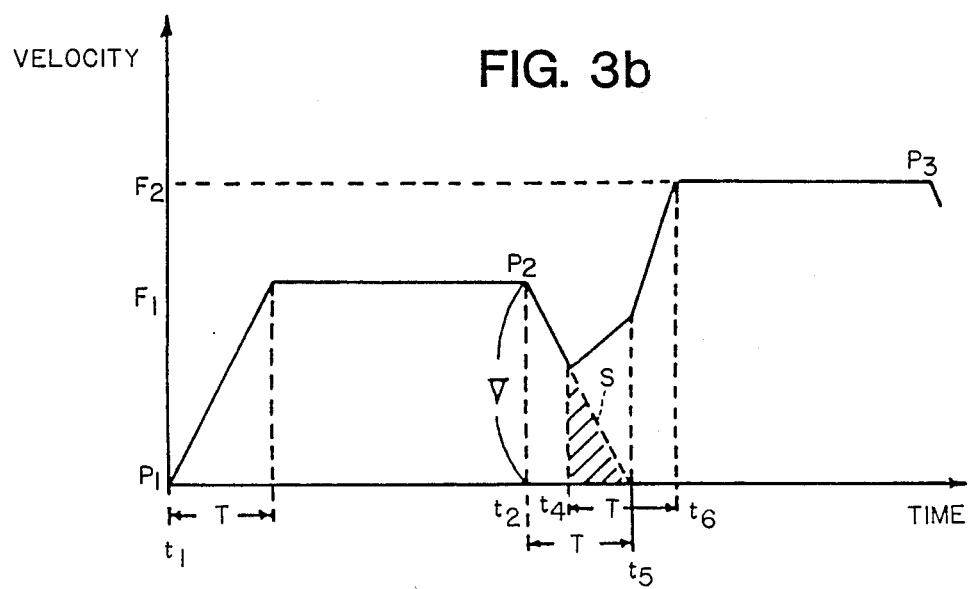

FIG. 3(b) illustrates the state of change in velocity at a portion where the deceleration time T and acceleration time T overlap. Specifically, the movable element starts to be decelerated at time $t_2$. At time $t_4$, which is when the amount of residual command pulses becomes 40% of the amount of accumulated command pulses at deceleration time $t_2$, the next pulse distribution calculation is started, the command pulses at acceleration based on the commanded velocity F2 are added, and the movable element is accelerated.

The pulse distribution calculation start timing along the next travel path is determined by setting the amount of accumulated pulses S of the shaded portion in FIG. 3(b) as follows:

$$S = (\tfrac{1}{2})aVT$$

(where V: axial velocity)
which can be calculated for each axis.

Figure 4:
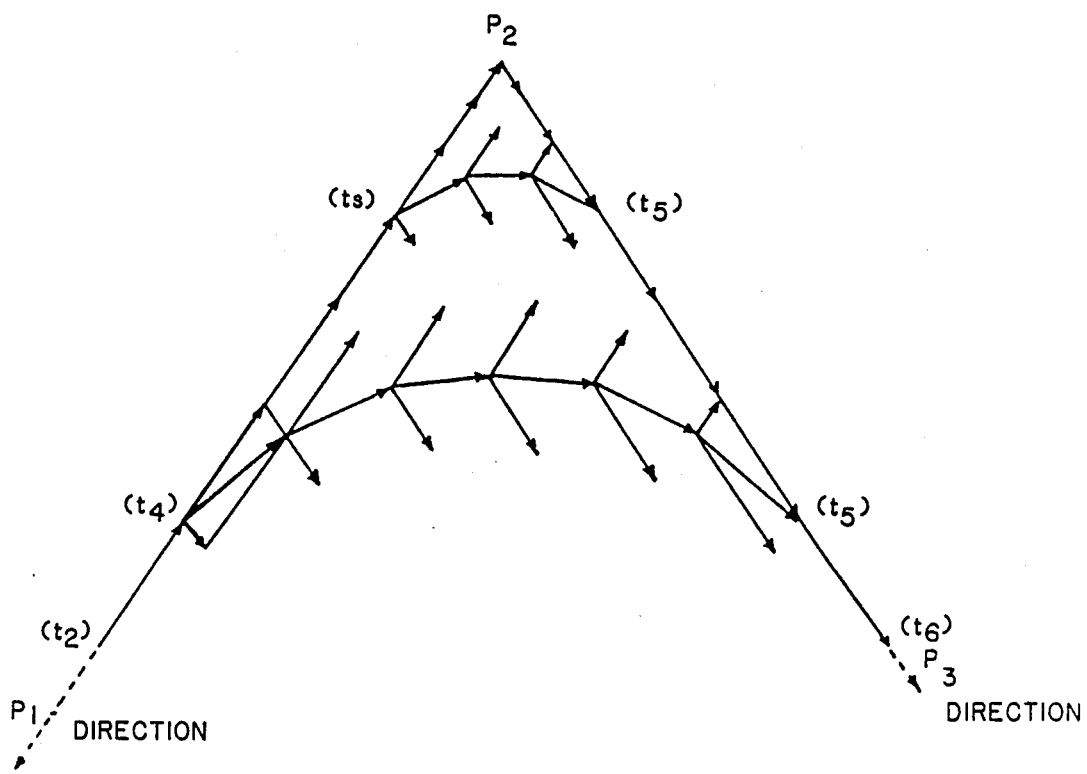
FIG. 4 is a graph showing trajectories in the same embodiment shown in FIG. 3.

FIG. 4 illustrates trajectories in the form of position vectors at each and every sampling time of the interpolating circuit 2 for a case where there are two specified parameters "a", namely large and small. Specifically, if the parameter "a" is large, the movable element on a path from the coordinate point P1 to the commanded position P2 starts to be decelerated at time $t_2$, and a timing decided by the parameter "a" of, e.g. 80%, which specifies the amount of accumulation at time $t_4$, is sensed. From this time onward, the position vector from the coordinate point P2 to the commanded position P3 is successively added to the position vector pointing towards the commanded position P2 while deceleration is being performed. At time $t_5$, this path reaches a straight line connecting P2 and P3. In a case where the specified parameter "a" is smaller than the above (about 30%), addition of the position vectors takes place between time $t'_4$ and time $t'_5$, and the trajectory forms an arcuate shape near the commanded position P2.

Figure 5A:
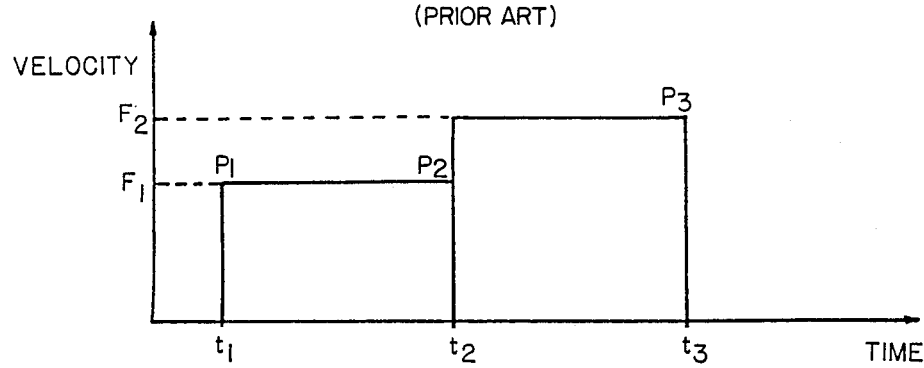
FIG. 5 is a graph illustrating characteristics according to a conventional velocity control system.
Figure 5B:
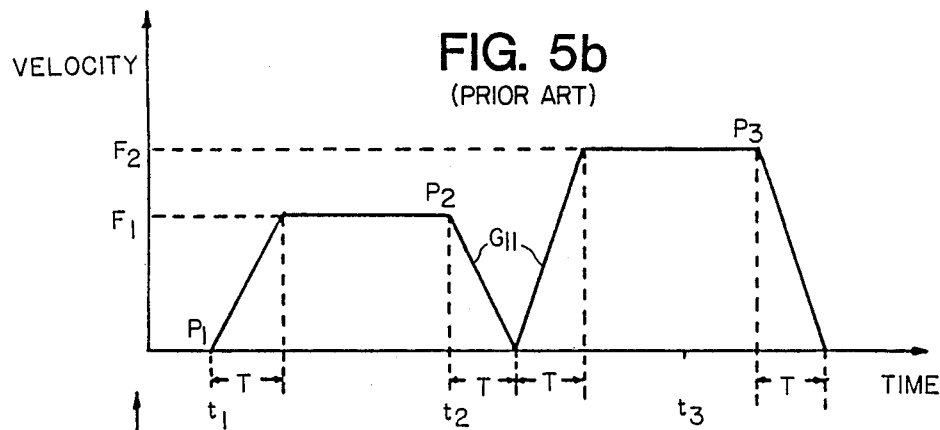
Figure 5C:
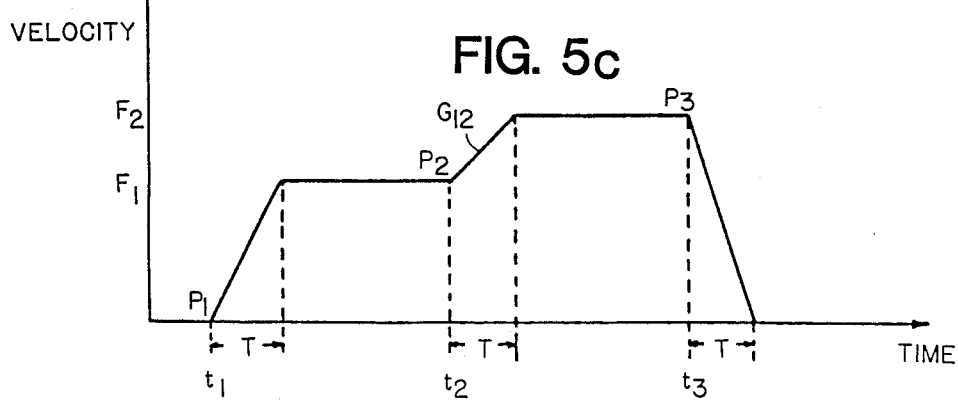

If the specified parameter "a" is set to 0, the trajectory can be made to coincide with the trajectory of code G11, shown in FIG. 5(b), that passes through the commanded position P2. If the parameter "a" is set to 100, the trajectory can be made to coincide with the trajectory described by G12 of FIG. 5(c).

Thus, with the above-described embodiment, the amount of accumulated deceleration command pulses at deceleration is specified as a percentage so that the size of the circular arc of the trajectory can be determined at will. This makes it possible to easily correct a path error.

Though the present invention has been described based on a preferred embodiment, the invention is not limited to this embodiment. The size of a circular arc can be determined by various methods in dependence upon the sensed amount of residual command pulses, and a transition to acceleration control can be made smoothly by cutting the deceleration time of the movable element.

The present invention is effective when applied to an industrial robot, and is very useful when applied to a robot having many articulations. The invention is not limited to robots but is also useful when applied to the servo circuits of machine tools controlled by a numerical control unit.

We claim:

1. A robot path error correction system for performing a pulse distribution calculation along each axis in dependence upon commanded position data on the basis of velocity command pulses for accelerating and velocity command pulses for decelerating a feedrate to a commanded velocity at a predetermined time constant, and driving and controlling a movable element in a specified traveling direction, comprising:
   (a) means for sensing a remaining amount of command pulses at deceleration of said movable element;
   (b) timing deciding means for specifying start timing of a pulse distribution calculation along a subsequent travel path in dependence upon the sensed amount of said velocity command pulses remaining; and
   (c) adding means for adding said velocity command pulses which accelerate the feedrate and said velocity command pulses which decelerate the feedrate in accordance with a commanded velocity and commanded position at the specified timing.

2. A robot path error correction system according to claim 1, wherein said timing deciding means decides start timing of a pulse distribution calculation along a subsequent travel path by specifying a parameter for multiplying an amount of accumulated command pulses at deceleration.

* * * * *